(12) United States Patent
Matsumoto

(10) Patent No.: US 7,200,286 B2
(45) Date of Patent: Apr. 3, 2007

(54) IMAGE READING APPARATUS

(75) Inventor: Atsushi Matsumoto, Tokyo (JP)

(73) Assignee: Canon Kabushiki Kaisha (KP)

( * ) Notice: Subject to any disclaimer, the term of this patent is extended or adjusted under 35 U.S.C. 154(b) by 586 days.

(21) Appl. No.: 10/795,943

(22) Filed: Mar. 8, 2004

(65) Prior Publication Data

US 2004/0179747 A1    Sep. 16, 2004

(30) Foreign Application Priority Data

Mar. 11, 2003    (JP) .............................. 2003-064998

(51) Int. Cl.
G06K 9/32    (2006.01)
G02B 5/12    (2006.01)

(52) U.S. Cl. ...................... 382/300; 382/261; 358/525

(58) Field of Classification Search ................ 382/205, 382/260, 261, 275, 278, 279, 300, 318; 345/606–610, 345/615; 358/1.2, 1.9, 474, 505, 512, 514, 358/520, 521, 525

See application file for complete search history.

(56) References Cited

U.S. PATENT DOCUMENTS

| | | | | |
|---|---|---|---|---|
| 5,513,281 | A * | 4/1996 | Yamashita et al. | 382/278 |
| 5,570,436 | A * | 10/1996 | Fukushima et al. | 382/300 |
| 6,188,804 | B1 * | 2/2001 | Weldy et al. | 382/300 |
| 6,625,325 | B2 * | 9/2003 | Gindele et al. | 382/260 |
| 6,628,848 | B1 * | 9/2003 | Nakamura | 382/318 |
| 6,832,009 | B1 * | 12/2004 | Shezaf et al. | 382/300 |
| 6,934,056 | B2 * | 8/2005 | Gindele et al. | 358/1.9 |
| 6,977,722 | B2 * | 12/2005 | Wohlstadter et al. | 356/246 |

FOREIGN PATENT DOCUMENTS

JP    2002-232654 A    8/2002
JP    2003-64998 A    3/2003

* cited by examiner

*Primary Examiner*—Kanjibhai Patel
(74) *Attorney, Agent, or Firm*—Rossi, Kimms & McDowell, LLP

(57) ABSTRACT

There are provided an image reading apparatus, in which a plurality of image reading sensors are joined one another, and which is capable of simply and precisely compensating for defective data in joint portions of the plurality of image reading sensors through interpolation so as to obtain a high-quality image. The image reading apparatus includes an image reading portion for reading an image on an original for each pixel with the use of a plurality of image reading sensors arranged in a row in the direction of the array of pixels, and a pixel interpolation portion for computing, with the use of a filter portion, interpolation pixel data for compensating, through interpolation, for a target pixel that is an unreadable pixel situated between adjacent image reading sensors. The filter portion includes a plurality of filters having respective different filter sizes, and the pixel interpolation portion detects the degree of flatness of data for pixels situated in the vicinity of the target pixel and changes over the plurality of filters according to a result of detection of the degree of flatness.

8 Claims, 10 Drawing Sheets

(TARGET PIXEL BEING IN POSITION "5")

Image Reading Apparatus

BACKGROUND OF THE INVENTION

1. Field of the Invention

The present invention relates to image reading apparatuses, such as an image scanner, a facsimile machine and a copying machine, and more particularly to an image reading apparatus that uses a close-contact type image sensor.

2. Description of Related Art

Heretofore, there has been known an image reading apparatus for reading an image on an original to produce a digital signal for each pixel. More specifically, the image reading apparatus is provided with a plurality of image reading sensors each having a one-dimensional array of pixels, and the plurality of image reading sensors are arranged in a row in the direction of the array of pixels so as to cover the required image reading range and are configured to read an image on an original while moving in the direction perpendicular to the direction of the array of pixels, thereby producing a two-dimensional digital signal.

However, in such a type of image reading apparatus, as the reading resolution becomes higher, it becomes difficult to accurately set the distance in a joint portion between each pair of adjacent image reading sensors of the plurality of image reading sensors to a distance approximately equivalent to one pixel. If the distance in a joint portion between adjacent image reading sensors is large, when an image on an original having periodicity, such as a halftone-dotted image in print, is read, missing data occurs at a part of image data read corresponding to the position of the joint portion between adjacent image reading sensors, so that streak-like noises would be unfavorably generated, thereby causing deterioration of image quality.

In order to compensate for such missing data in the joint portion between adjacent image reading sensors through interpolation, for example, in Japanese Laid-Open Patent Application No. 2003-8853, there is proposed a method of performing one-dimensional filtering computation. In the proposed method, such filtering computation is performed at all elements of image data whether in interpolation positions (positions of missing data) or not. Then, a difference between a result of filtering computation and actual data (luminance value) in an arbitrary data position other than any interpolation position is obtained, and the result of filtering computation that has been found to be nearest the actual data is selected as a result of filtering computation in an interpolation position.

However, in the above-mentioned proposed method, since a comparison is made between each of a plurality of results of filtering computation and the associated actual luminance value in all pixels except joint portions of image reading sensors, a complicated processing operation is required. Also, in order to perform high-precision interpolation, it is necessary to increase the number of pieces of reference data. Therefore, the above-mentioned proposed method has limitations from the viewpoint of simply and precisely compensating for missing data in joint portions of image reading sensors through interpolation so as to obtain a high-quality image.

SUMMARY OF THE INVENTION

It is an object of the present invention to provide an image reading apparatus, in which a plurality of image reading sensors are joined one another, and which is capable of simply and precisely compensating for defective data in joint portions of the plurality of image reading sensors through interpolation so as to obtain a high-quality image.

To attain the above object, in accordance with one aspect of the present invention, there is provided an image reading apparatus comprising an image reading portion for reading an image on an original for each pixel, and a pixel interpolation portion for compensating for pixel data corresponding to a defective pixel in the image reading portion through interpolation with interpolation data, the pixel interpolation portion including a degree-of-correlation detecting portion for detecting the degree of correlation of a plurality of pixel data situated in the vicinity of the defective pixel, a filter-size selecting portion for selecting a filter size according to a result of detection provided by the degree-of-correlation detecting portion, and an interpolation data computing portion for computing the interpolation data by performing a filtering operation on a plurality of pixel data situated in the vicinity of the defective pixel according to the filter size selected by the filter-size selecting portion.

With the image reading apparatus as configured above, it is possible to simply and precisely compensate for defective data in joint portions of the plurality of image reading sensors through interpolation so as to obtain a high-quality image.

The above and further objects, features and advantages of the present invention will become apparent to those skilled in the art upon reading of the following detailed description of preferred embodiments thereof when taken in conjunction with the accompanying drawings, in which like reference characters designate the same or similar parts throughout the figures thereof.

DETAILED DESCRIPTION OF THE PREFERRED EMBODIMENTS

Hereinafter, preferred embodiments of the present invention will be described in detail with reference to the drawings.

First Embodiment

<Outline Arrangement of Image Reading Apparatus>

Figure 1:
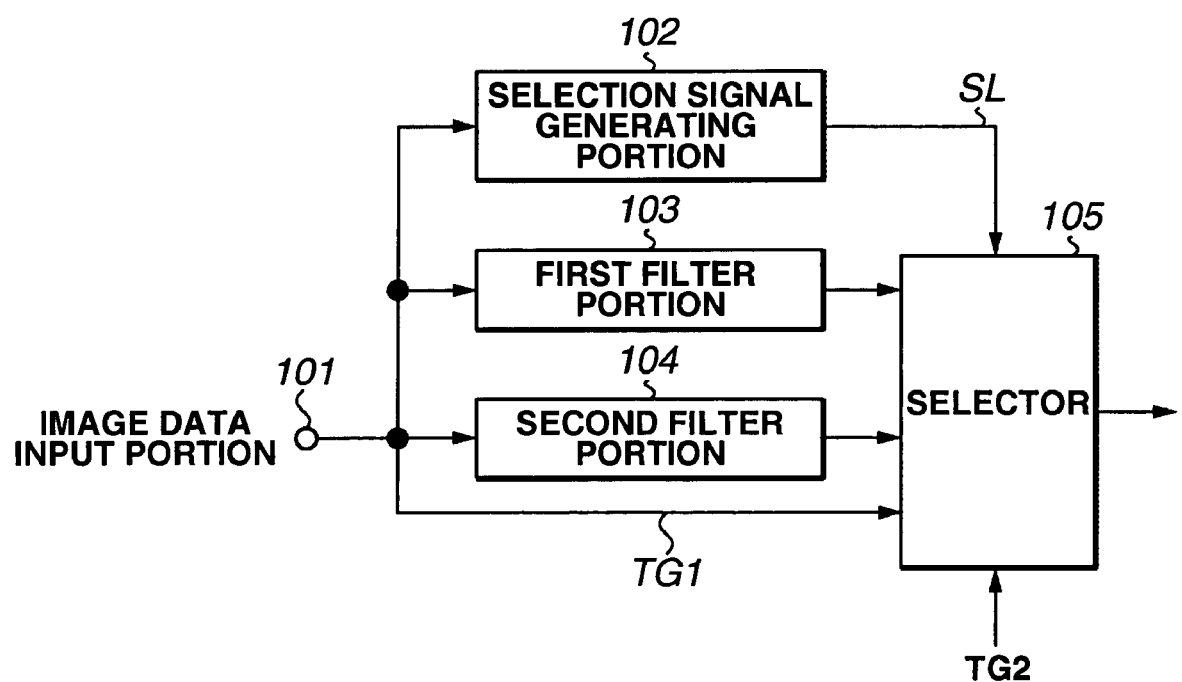
FIG. 1 is a block diagram showing the arrangement of an interpolation computing portion provided in an image reading apparatus (image scanner) according to a first embodiment of the invention.
Figure 2:
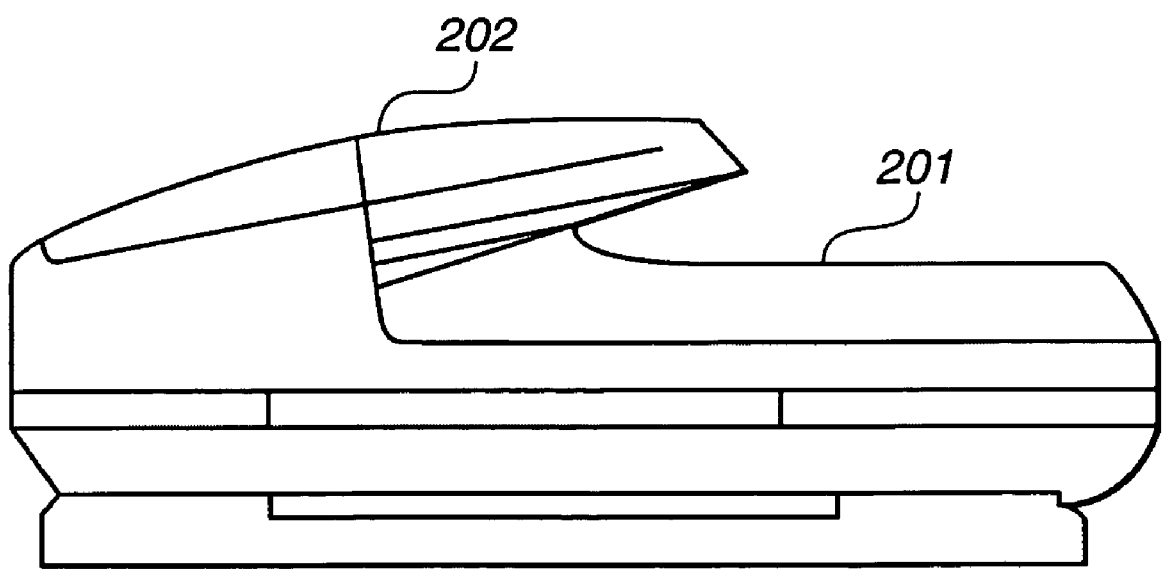
FIG. 2 is a diagram showing the appearance of the image reading apparatus according to each embodiment of the invention.

FIG. 1 is a block diagram showing the arrangement of an interpolation computing portion provided in an image reading apparatus (image scanner) according to a first embodiment of the invention, and FIG. 2 is a diagram showing the appearance of the image reading apparatus according to the first embodiment.

Referring first to FIG. 2, in the scanner (image reading apparatus) according to the first embodiment, an image on a sheet of paper, which serves as an original, is illuminated and is then scanned by a one-line image reading sensor (see FIG. 3) so as to be converted into an electrical signal as raster image data. When the user of the apparatus sets the original on an original-placing board glass of the scanner and operates an operation portion (not shown) to give an instruction for reading, the scanner reads the original to convert an image thereon into an electrical signal. Alternatively, when the user of the apparatus sets sheets of paper on a tray 202 of a document feeder 201 and operates the operation portion to give an instruction for reading, the document feeder 201 feeds the sheets of paper one by one to enable the scanner to read an image on each original.

<Details of One-line Image Reading Sensor>

Figure 3:
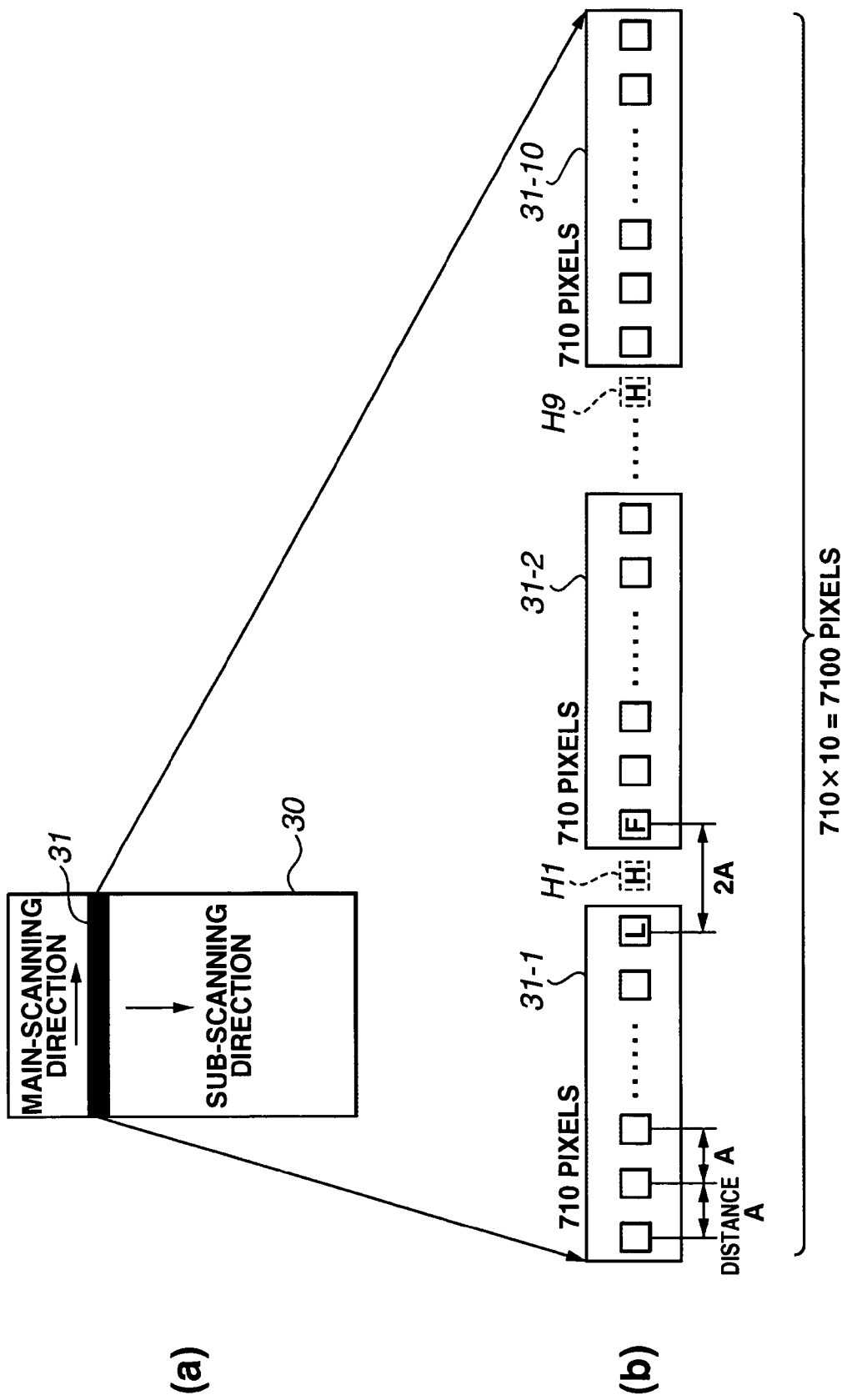
FIG. 3 is a diagram for illustrating the operation of a one-line image reading sensor according to each embodiment of the invention.

FIG. 3 is a diagram for illustrating the operation of the one-line image reading sensor according to the first embodiment. Part (a) of FIG. 3 shows an original-placing board glass 30 and a one-line image reading sensor 31, and part (b) of FIG. 3 shows an enlarged view of the one-line image reading sensor 31.

Referring to part (a) of FIG. 3, when the user of the apparatus sets an original on the original-placing board glass 30 in such a manner that an image to be read points downward, the original is illuminated by an illumination unit, and light reflected from the original passes through a lens (SELFOC (trademark) lens array or the like) to form an optical image on the one-line image reading sensor 31. The one-line image reading sensor 31 converts the optical image into an analog electrical signal, which is then converted into digital image data by an A/D converter (not shown). Since the one-line image reading sensor 31 has photoelectric conversion devices, such as CCD devices, to generate image data in the main-scanning direction, the scanner transports the one-line image reading apparatus 31 in the direction perpendicular to the main-scanning direction (in the sub-scanning direction) to generate two-dimensional image data.

The one-line image reading sensor 31 is composed of a plurality of small image sensors 31-1 to 31-10 so as to supply a required number of main-scanning pixels. Assuming that an image 300 mm wide is read at the resolution of 600 dpi, the required number of main-scanning pixels becomes:

300 mm/(25.4/600)=about 7100 pixels, where 1 inch=25.4 mm.

Each of the image sensors 31-1 to 31-10 is composed of 710 pixels, so that tens of "710 pixels" constitute "7100 pixels".

Since the reading resolution is assumed to be 600 dpi, the distance (length) of one pixel is as follows:

1/600 inch=25.4/600 mm=about 0.0423 mm.

Accordingly, the distance "A" shown in part (b) of FIG. 3 is about 0.0423 mm in the case of the first embodiment.

If the interval between the last pixel L of each of the image sensors 31-1 to 31-9 and the first pixel F of the next image sensor is made to be about 0.0423 mm, no problems would arise. However, in terms of the structural arrangement of image sensor chips, it may be very difficult or physically impossible to set such an interval, and a larger interval might be required. In the case of the first embodiment, the interval between image sensor chips is made to be "2A", which is twice as large as the distance "A", so that the packaging of the image sensors 31-1 to 31-10 can be facilitated.

However, since the interval between the pixel L and the pixel F is larger than the interval between adjacent pixels disposed in one image sensor, as shown in part (b) of FIG. 3, joint portions of the image sensors 31-1 to 31-10 would cause conspicuous noise to appear in read image data. Therefore, in the first embodiment, image data corresponding to a defective pixel H, which is situated between the pixel L and the pixel F and is unreadable, is computed by an interpolation computing portion (to be described later) and is used to compensate for data for each of the joint portions of the image sensors 31-1 to 31-10 through interpolation.

Since the pixel H, which is to be subjected to interpolation, exists in each of the joint portions of the image sensors 31-1 to 31-10, in the first embodiment, it becomes necessary to make the interpolation computing portion perform a computing operation at nine points in total, i.e., from a pixel H1 between the first image sensor and the second image sensor to a pixel H9 between the ninth image sensor and the tenth image sensor.

<Details of Interpolation Computing Portion>

Referring to FIG. 1, the interpolation computing portion is composed of an image data input portion 101, a selection signal generating portion 102, a first filter portion 103, a second filter portion 104 and a selector 105.

When image data is inputted from the image data input portion 101, the first filter portion 103, which is suited for interpolation for image data having periodicity, and the second filter portion 104, which performs interpolation for image data unsuitable for the first filter portion 103, perform the respective convolution computing operations to produce filtering-processed image signals. The selection signal generating portion 102 determines whether the inputted image data is image data suited for the first filter portion 103 and generates and outputs a selection signal SL indicative of a result of such determination.

The selector 105 is arranged to receive three image signals, i.e., the respective filtering-processed image signals produced by the first and second filter portions 103 and 104 and a target pixel signal TG1, and a target-pixel position information signal TG2. Then, when the target-pixel position information signal TG2 does not indicate any position requiring interpolation, the selector 105 outputs the target pixel signal TG1 as it stands. On the other hand, when the target-pixel position information signal TG2 indicates a position requiring interpolation, i.e., the position of each of the defective pixels H1 to H9, the selector 105 selects and outputs one of the filtering-processed image signal produced by the first filter portion 103 and the filtering-processed image signal produced by the second filter portion 104 according to the selection signal SL.

In the following, the processing operation of the interpolation computing portion will be described more specifically.

Image data as read by the one-line image reading sensor 31 is inputted from the image data input portion 101. In the case of the first embodiment, data for the target pixel and five pixels situated on each of the right and left sides thereof, i.e., data for eleven pixels in total, are inputted. It is now assumed that each pixel signal is an 8-bit multivalued luminance signal of level "0" to "255". The target pixel is arranged to shift serially by one pixel. If the target pixel is the sixth pixel, image data for the first to eleventh pixels are supplied and processed, and, when the processing operation on the sixth pixel serving as the target pixel has been completed, the target pixel is shifted to the seventh pixel, so that image data for the second to twelfth pixels are supplied, thereby enabling the processing operation for the number of main-scanning pixels to be continued. Further, when the processing operation for the entire number of main-scanning pixels has been completed, the reading operation advances by one line in the sub-scanning direction to continue the processing operation in the similar way as much as the number of sub-scanning reading lines, then coming to an end.

It should be noted that the number "11" of pixels of image data that are supplied from the image data input portion 101 is a value determined according to the size of filter portions. If the target pixel is situated at an end portion of the image, there is a probability that image data for eleven pixels can not be supplied. In that event, pixel data as inputted should be outputted as they are without being processed.

Here, while image data to be inputted from the one-line image reading sensor 31 are those for 710_10 (=7100) pixels in the main-scanning direction, it is considered that, for the purpose of simplifying the processing operation, each of the above-mentioned interpolation pixels H1 to H9 is inserted, as dummy data, in between the last pixel L of each of the image sensors 31-1 to 31-9 and the first pixel F of the next image sensor. Since data for each of the interpolation pixels H1 to H9 is outputted after being finally subjected to the interpolation computing operation, the dummy data may be set to any value. It is here assumed that "0" is inputted as the dummy data.

It would be seen from the foregoing that the first pixel to the 710-th pixel correspond to pixel data generated by the first image sensor 31-1, the 711-th pixel corresponds to "H1" (dummy data), the 712-th pixel to the 1421-th pixel correspond to pixel data generated by the second image sensor 31-2, and the 1422-th pixel corresponds to "H2" (dummy data) The subsequent pixels correspond to image data generated and inputted in the same way. Accordingly, image data to be inputted are considered to be image data for 7109 pixels in total, "7109" being obtained by adding the number "9" of defective pixels to the number "7100" of main-scanning pixels. The position of each of the defective pixels H1 to H9, which are required to be subjected to interpolation, becomes:

((the number "710" of pixels of each image sensor+ 1)_N)-th pixel, where N is an integral number.

While it has been mentioned that the required number of main-scanning pixels is "7100", even if the one-line image reading sensor is arranged to be able to read a wider range than the required range, image data for pixels situated outside the required range may be neglected without being used, so that no serious problems would arise.

Image data inputted from the image data input portion 101 is supplied to the first filter portion 103. The image data as inputted is image data for the target pixel and five pixels situated on each of the right and left sides in the vicinity of the target pixel, i.e., image data for eleven pixels, and a convolution computing operation is performed with the use of the image data for eleven pixels. The processing operation of the first filter portion 103 is required for performing an effective interpolation computing operation on image data having periodicity, as mentioned above.

Here, one example of filter coefficients for eleven pixels will be mentioned as follows:

23, −49, 75, −98, 113, 0, 113, −98, 75, −49, 23.

In the filter coefficients for eleven pixels, coefficient "0" situated at the center is used for the target pixel. In each of the pixels H1 to H9, which are required to be subjected to interpolation, there is previously set dummy data, which is made "0" so as not to have an influence on the convolution computing operation. Therefore, the convolution computing operation is performed with ten pixels other than the target pixel. With the above coefficients used, image data for each pixel is multiplied by the coefficient corresponding to the position of the individual pixel. For example, such a computing operation is performed that the leftmost coefficient "23" is multiplied by image data for the fifth pixel as counted to the left from the target pixel, and the second coefficient "−49" as counted from the far left is multiplied by image data for the fourth pixel as counted to the left from the target pixel.

The first filter portion 103 is arranged to compute a value obtained by dividing by "128" the summation of results of such multiplications for ten pixels. The number "128" is a normalization number for the filter coefficients. If it is intended to obtain the same frequency response, the filter coefficients will vary according to the normalization number. It is desirable that the normalization number is the power of "2" for the purpose of hardware processing or high-speed software processing. In the case of the first embodiment, the normalization number is tentatively set to "128".

Figure 4:
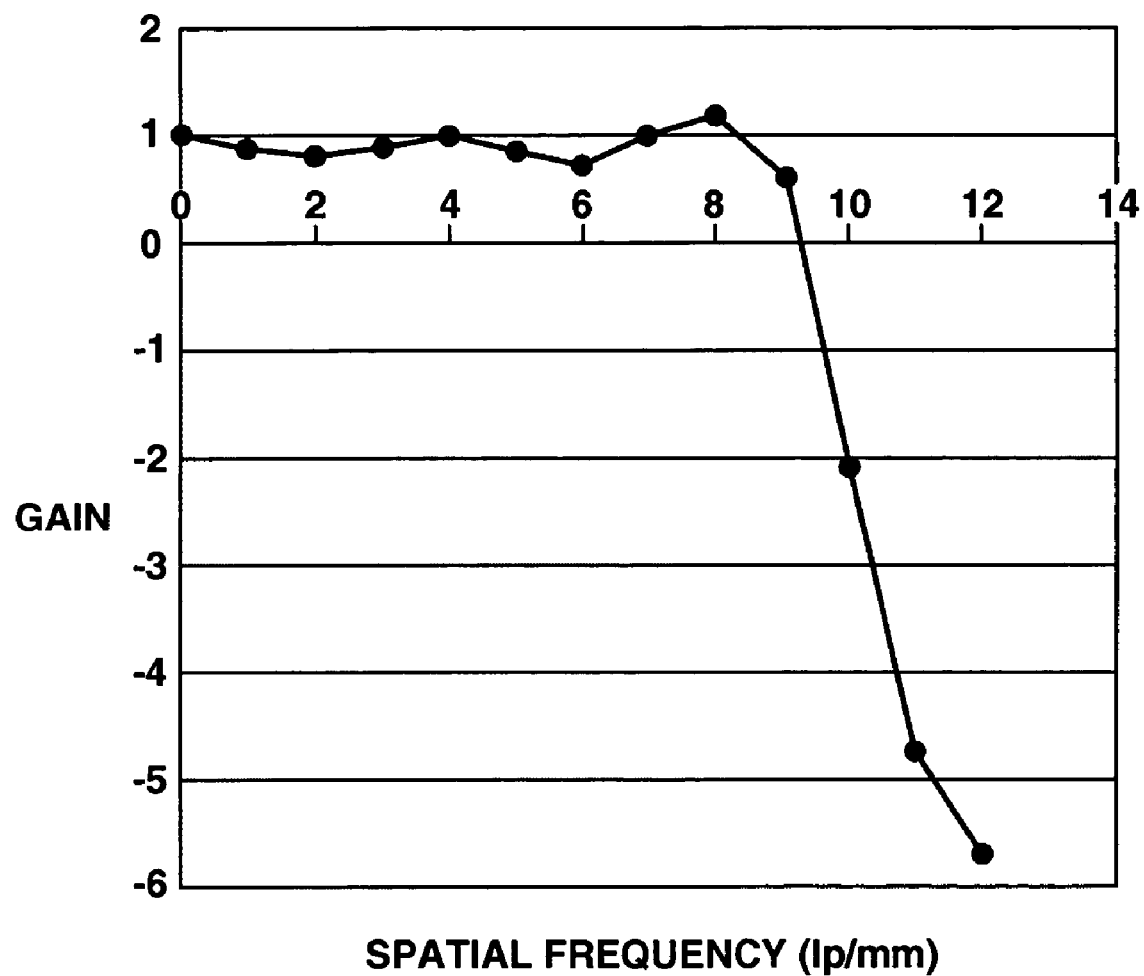
FIG. 4 is a graph showing a spatial frequency response of coefficients that are used in a first filter portion shown in FIG. 1.

FIG. 4 is a graph showing the spatial frequency response of the above-mentioned coefficients to be used in the first filter portion 103, in which the abscissa axis represents a spatial frequency (1 p/mm) and the ordinate axis represents a gain.

In the first embodiment, since the reading resolution is 600 dpi, the graph of FIG. 4 illustrates up to the spatial frequency of 300 dpi=about 12 [1 p/mm]. The gain becomes almost "1" when the spatial frequency is in the range of 0 [1 p/mm] to 8 [1 p/mm]. This implies that it is possible to almost adequately perform an interpolation process with respect to an image having a spatial frequency of up to 8 [1 p/mm]. In other words, even if halftone dots having high periodicity, such as print, exist in an image on an original, it is possible to adequately compute interpolation pixel data from neighboring pixel data through interpolation if the image has a spatial frequency of up to 8 [1 p/mm]=about 200 lines. Accordingly, it is possible to prevent pixel data deriving from the joint portions (H1 to H9) of the image sensors from becoming conspicuous.

It would also be seen that, as the spatial frequency becomes higher, the gain becomes minus while increasing in absolute value. This implies that, with respect to an image having a higher frequency component, the amplitude of image data is reversed from that of the image on an original and becomes large unnaturally. However, since any image on originals rarely has a spatial frequency of more than 200 lines at present, no serious problems would arise.

Image data inputted from the image input portion 101 is also supplied to the second filter portion 104. As inputted data, data for the target pixel and data for right and left pixels adjacent to the target pixel, i.e., data for three pixels in total, are selected, and a convolution computing operation is performed by the second filter portion 104 with the use of the data for three pixels. The processing operation of the second filter portion 104 is required for performing an effective interpolation computing operation on image data that is unsuitable for the processing operation of the first filter portion 103. Further, since the second filter portion 104 is intended for an image having no periodicity, it is possible to configure the second filter portion 104 in a filter size smaller than the size of the first filter portion 103.

One example of filter coefficients for three pixels will be mentioned as follows:

64, 0, 64.

In the filter coefficients for three pixels, coefficient "0" situated at the center is used for the target pixel. In each of the pixels H1 to H9, which are required to be subjected to interpolation, there is previously set dummy data, which is made "0" so as not to have an influence on the convolution computing operation. Therefore, the convolution computing operation is performed with two pixels other than the target pixel. Further, like the first filter portion 103, the normalization number is "128", and the processing operation of the second filter portion 104 is performed with a result of the convolution computing operation divided by "128". Here, while the normalization number is set to "128", such a simple circuit arrangement may be employed that the normalization number is set to "2" and the coefficient for each of the right and left pixels is set to "1" and the coefficient for the target pixel is set to "0". Although, in the first embodiment, the normalization number in the second filter portion 104 is made the same as in the first filter portion 103, it is unnecessary to employ the same normalization number.

The image data input portion 101 supplies image data also to the selection signal generating portion 102. The selection signal generating portion 102 determines whether the image data as inputted is data of an image having no periodicity, which is unsuitable for the processing operation of the first filter portion 103. When having determined that the image data as inputted is data of an image suitable for the processing operation of the first filter portion 103, the selection signal generating portion 102 outputs a selection signal SL at "1", and when having determined that the image data as inputted is data of an image unsuitable for the processing operation of the first filter portion 103, the selection signal generating portion 102 outputs the selection signal at "0". The selection signal SL is supplied to the selector 105.

<Details of Selection Signal Generating Portion 102>

Figure 5:
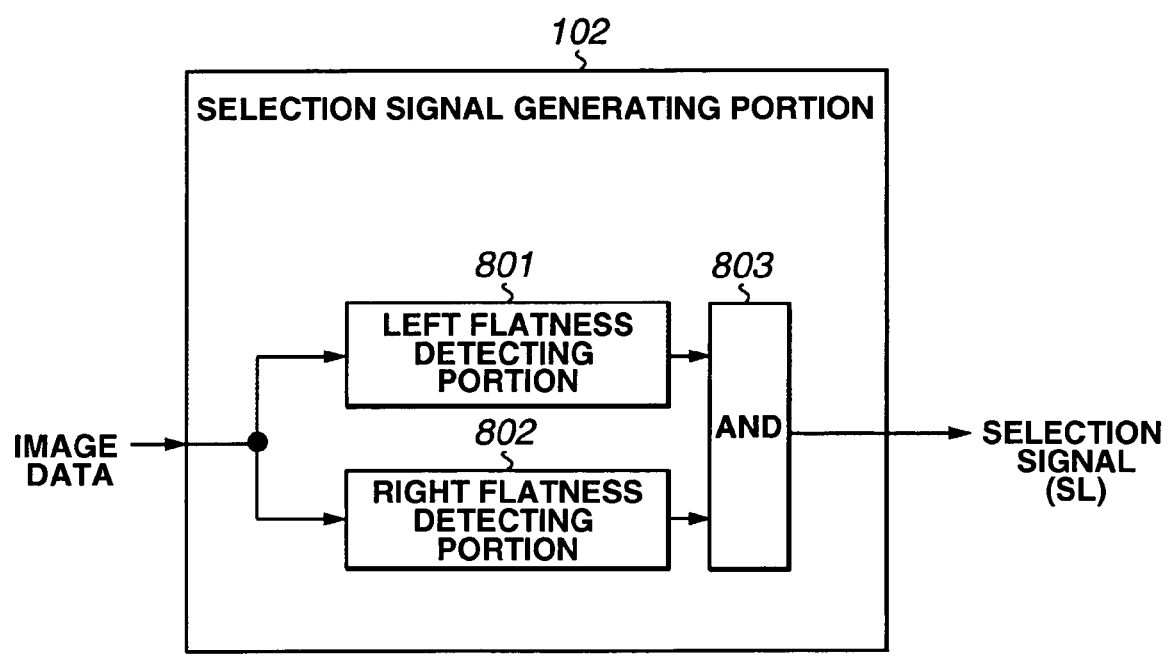
FIG. 5 is a diagram showing the internal arrangement of a selection signal generating portion shown in FIG. 1.

FIG. 5 is a diagram showing the internal arrangement of the selection signal generating portion 102.

Referring to FIG. 5, the selection signal generating portion 102 is composed of a left flatness detecting portion 801, a right flatness detecting portion 802 and an AND processing portion 803. Each of the left flatness detecting portion 801 and the right flatness detecting portion 802 outputs a signal at "0" when having determined that the luminance level of image data is flat (i.e., the degree of correlation of a plurality of pixel data is high), and outputs a signal at "1" when having determined that the luminance level of image data is not flat (i.e., the degree of correlation of a plurality of pixel data is low). Thus, when it has been determined by the left flatness detecting portion 801 and the right flatness detecting portion 802 that neither of the luminance levels of image data on the right and left sides of the target pixel is flat, the AND processing portion 803 outputs a signal at "1" to produce the selection signal SL indicating that a result of processing provided by the first filter portion 103 is to be used. When it has been determined that at least one of the luminance levels of image data on the right and left sides of the target pixel is flat, the AND processing portion 803 outputs a signal at "0" to produce the selection signal SL indicating that a result of processing provided by the second filter portion 104 is to be used.

Figure 6:
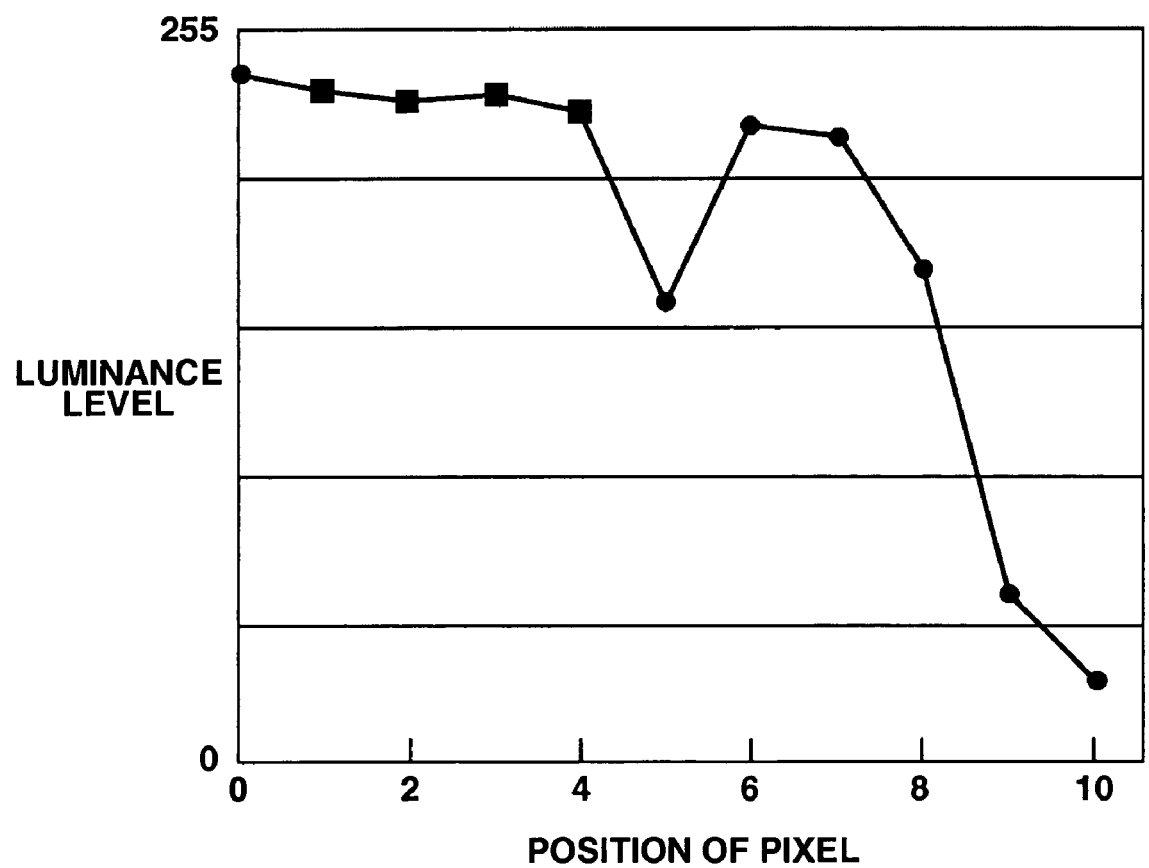
FIG. 6 is a graph showing an example of image that is not suited for a result of processing provided by the first filter portion shown in FIG. 1.

FIG. 6 is a graph showing an example of image that is not suited for a result of processing provided by the first filter portion 103.

Figure 7:
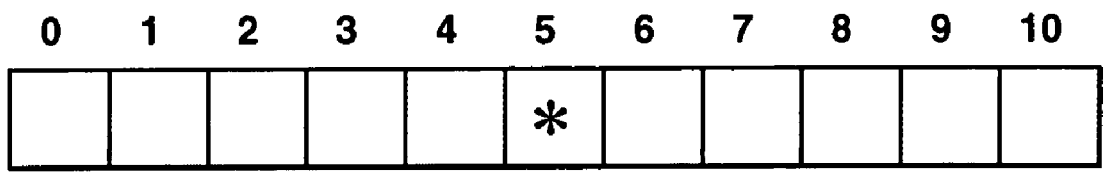
FIG. 7 is a diagram showing the positions of pixels for the purpose of explaining various processing operations.

In the graph of FIG. 6, the abscissa axis represents the position of a pixel, and the ordinate axis represents the luminance level, thereby illustrating the distribution of luminance levels in the main-scanning direction. When the luminance level is high, it indicates a bright pixel, and when the luminance level is low, it indicates a dark pixel. In the case of the example of image shown in FIG. 6, the target pixel is situated in the position "5" (marked with *) as shown in FIG. 7 (numbers "0" to "10" being assigned to pixels from the left to the right), which illustrates image data supplied to the first filter portion 103. If image data of such a target pixel is processed by the first filter portion 103, it would result in a darker pixel than the surrounding pixels. If such a darker pixel continues for several lines in the sub-scanning direction, noises corresponding to the joint portions of the image sensors would become conspicuous.

It would be seen from the graph of FIG. 6 that the example of image represents an image having no periodicity, in which pixels situated on the left side of the target pixel are bright and pixels situated on the right side of the target pixel are dark. Such a distribution occurs where the pixels situated on the left side of the target pixel correspond to a sheet surface and the pixels situated on the right side of the target pixel correspond to characters. As mentioned in the foregoing, if such a condition continues over several lines in the sub-scanning direction, a dark linear noise would be caused at a portion corresponding to a part of the sheet surface adjacent to the character portion. In that event, using the processing operation of the second filter portion 104 makes it possible to perform an adequate interpolation processing operation. In other words, with the processing operation of the second filter portion 104, a mean value between data for the pixel situated in the position "4" and data for the pixel situated in the position "6" is used as interpolation pixel data, so that any extremely-dark and conspicuous noise as represented in FIG. 6 can be prevented.

Thus, in cases where the inputted image data has been determined to be data of an image having no periodicity and unsuitable for the processing operation of the first filter portion 103 (i.e., data having a distribution of luminance levels unsuitable for the processing operation of the first filter portion 103), a result of the processing operation of the second filter portion 104 is made to be used, so that any conspicuous noise corresponding to each joint portion of the image sensors can be prevented form occurring.

The left flatness detecting operation is performed as described below.

First, the left flatness detecting portion 801 computes a maximum value MAX and a minimum value MIN from among luminance levels of four pixels (pixels "1", "2", "3" and "4" shown in FIG. 7). If a difference between the maximum value and the minimum value (MAX−MIN), i.e., the degree of correlation of pixel data for pixels "1", "2", "3"

and "4", is not greater than a predetermined threshold value (TH0), the left flatness detecting portion 801 determines the inputted image data to be data of a flat-luminance image and then outputs a signal at "0". If a difference between the maximum value and the minimum value (MAX−MIN) is greater than the predetermined threshold value (TH0), the left flatness detecting portion 801 determines the inputted image data to be data of a non-flat-luminance image and then outputs a signal at "1".

If the inputted image data is data of an image having periodicity and having amplitude greater than a given value, it is supposed that a difference between the maximum value and the minimum value (MAX−MIN) in the four pixels becomes a great value. To judge this supposition, the above-mentioned computing operation is performed to determine whether the inputted image data is data of a non-flat-luminance image (presumed to have periodicity) or data of a flat-luminance image. Although, in the first embodiment, image data for four pixels are used to detect the flatness of an image, it goes without saying that the invention is not limited to such an arrangement.

On the other hand, the right flatness detecting operation is performed in the same manner with the use of image data for pixels "6", "7", "8" and "9" shown in FIG. 7.

The selector 105 receives a result of the processing operation of the first filter portion 103, a result of the processing operation of the second filter portion 104, the target pixel signal TG1 and the target-pixel position information signal TG2, and outputs the target pixel signal TG1 as it stands when the target-pixel position information signal TG2 has indicated that the position of the target pixel does not correspond to any joint portion of the image sensors.

In cases where the position of the target pixel corresponds to a joint portion of the image sensors, the selector 105 selects and outputs one of a result of the processing operation of the first filter portion 103 and a result of the processing operation of the second filter portion 104 according to the selection signal SL.

In the first embodiment as described above, each joint portion of the image sensors is made to have a distance (length) corresponding approximately to two pixels, and data for one pixel in the distance of the joint portion is computed through interpolation with the use of neighboring pixel data. The interpolation computing operation is performed by means of digital filters that perform convolution computation on neighboring pixel data. First, such a filter as to make it possible to perform interpolation computation without deterioration of image quality if image data is data of an image having periodicity (having a low degree of correlation) is designed by means of the first filter portion 103, which is a digital filter of the filter size in which five pixels on each of the right and left sides of the target pixel are used. However, in the case of the interpolation computation by the first filter portion 103, if image data is data of an image having large variation of luminance values and having no periodicity (having a high degree of correlation), such as a boundary between a sheet surface and characters, deterioration of image quality would be caused. Therefore, there is provided the second filter portion 104, which is suitable for performing interpolation computation on data of an image having little periodicity, without deterioration of image quality, and which is a digital filter of the small filter size in which interpolation pixel data is generated with a mean value of data for one pixel on the right side and data for one pixel on the left side of the target pixel. Then, it is determined whether the distribution of luminance levels on each of the right and left sides of the target pixel to be subjected to interpolation is flat. If the distribution of luminance levels is determined to be flat, image data is considered to be data of an image having little periodicity, and, therefore, a result of the interpolation computing operation provided by the second filter portion 104 is used for interpolation.

Thus, there are provided the first filter portion 103 and the second filter portion 104, which are adaptively changed over. Accordingly, even in an image reading apparatus having such an image reading sensor that a plurality of image sensors are arranged in a row, it is possible to simply and precisely compensate for missing data corresponding to joint portions of the image sensors through interpolation so as to obtain a high-quality image without making any conspicuous noise caused by the joint portions of the image sensors.

Second Embodiment

Figure 8:
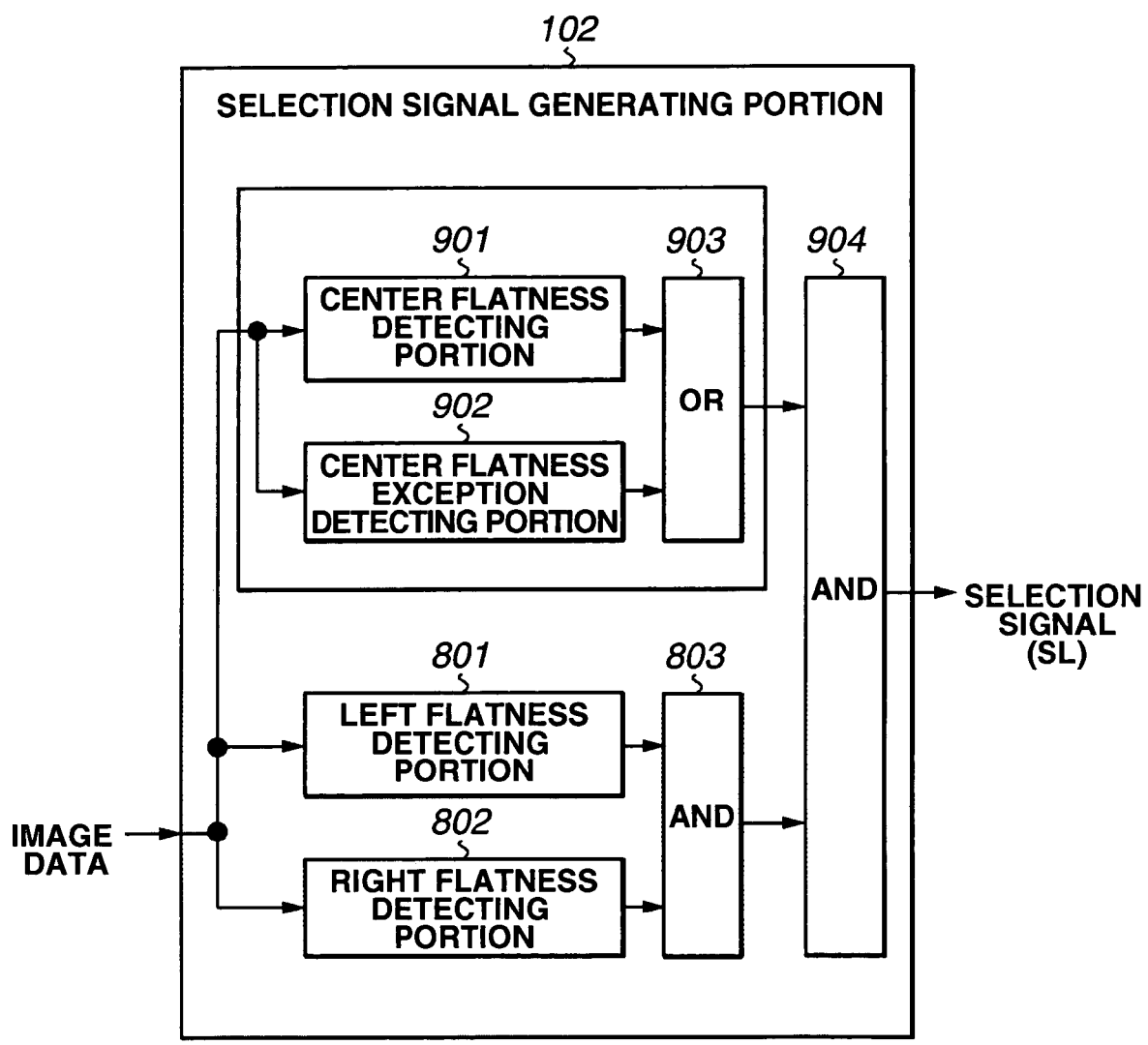
FIG. 8 is a block diagrams showing the internal arrangement of a selection signal generating portion according to a second embodiment of the invention.

In a second embodiment of the invention, the selection signal generating portion 102 is configured as shown in FIG. 8.

Referring to FIG. 8, the selection signal generating portion 102 includes a left flatness detecting portion 801, a right flatness detecting portion 802, an AND processing portion 803, a center flatness detecting portion 901, a center flatness exception detecting portion 902, an OR processing portion 903 and an AND processing portion 904. The left flatness detecting portion 801, the right flatness detecting portion 802 and the AND processing portion 803 function in the same manner and perform the same processing operation as those shown in FIG. 5 and, therefore, the details thereof are omitted from the following description.

In the second embodiment, with the selection signal generating portion 102 provided with the center flatness detecting portion 901 and the center flatness exception detecting portion 902, it is possible to generate a more highly accurate selection signal SL.

Figure 9:
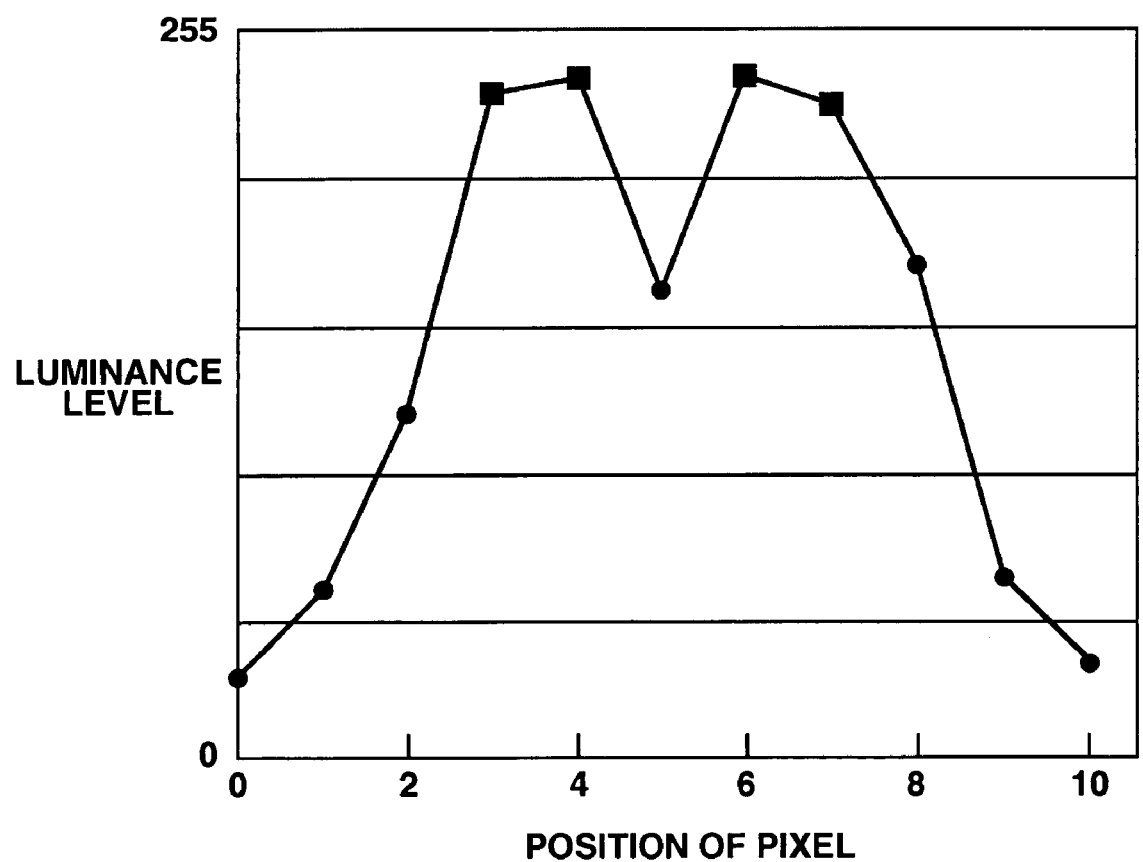
FIG. 9 is a graph showing the distribution of luminance levels of image data for the purpose of explaining a center flatness detecting operation in the second embodiment.

FIG. 9 is a graph showing an example of image that is not suited for a result of processing provided by the first filter portion 103. In the graph of FIG. 9, the abscissa axis represents the position of a pixel, and the ordinate axis represents the luminance level, thereby illustrating the distribution of luminance levels in the main-scanning direction. When the luminance level is high, it indicates a bright pixel, and when the luminance level is low, it indicates a dark pixel.

In the case of the example of image shown in FIG. 9, the target pixel is situated in the position "5" as shown in FIG. 7. If image data of such a target pixel is processed by the first filter portion 103, it would result in a darker pixel than the surrounding pixels. If such a darker pixel continues for several lines in the sub-scanning direction, noises corresponding to the joint portions of the image sensors would become conspicuous.

It would be seen from the graph of FIG. 9 that the example of image represents an image having no periodicity or having a too long period to detect with one pixel, in which two pixels situated on each of the right and left sides of the target pixel are brighter than the target pixel and pixels situated at a distance of three or more pixels from the target pixel are darker than the target pixel. Such a distribution occurs where the pixels situated on each of the right and left sides of the target pixel correspond to dark image data, such as lines, and the pixels situated on the center correspond to bright and white image data. As mentioned in the foregoing, if such a condition continues over several lines in the sub-scanning direction, a dark linear noise would be caused at a bright image portion located between two dark image data. In that event, using the processing operation of the second filter portion 104 makes it possible to perform an adequate interpolation processing operation. In other words, with the processing operation of the second filter portion 104, a mean value between data for the pixel situated in the position "4" and data for the pixel situated in the position "6" is used as interpolation pixel data, so that any extremely-dark and conspicuous noise can be prevented.

In that event, in order to avoid the above-mentioned problem, the center flatness detecting portion 901 outputs the selection signal SL at "0" to cause the result of processing provided by the second processing portion 104 to be selected. The center flatness detecting operation is performed as described below.

First, the center flatness detecting portion 901 computes a maximum value MAX and a minimum value MIN from among luminance levels of four pixels (pixels "3", "4", "6" and "7"0 shown in FIG. 7). If a difference between the maximum value and the minimum value (MAX−MIN) is not greater than a predetermined threshold value (TH2), the center flatness detecting portion 901 determines the inputted image data to be data of a flat-luminance image and then outputs a signal at "0". If a difference between the maximum value and the minimum value (MAX−MIN) is greater than the predetermined threshold value (TH2), the center flatness detecting portion 901 determines the inputted image data to be data of a non-flat-luminance image and then outputs a signal at "1". It should be noted that, in the case of the example of image shown in FIG. 9, if the flatness detecting operation were performed with the use of four pixels situated on each of the right and left sides of the target pixel, the inputted image data would be determined to be data of a non-flat-luminance image on both the right and left sides, and a result of processing provided by the first filter portion 103 would be used. Therefore, the center flatness detecting operation is performed to enable a result of processing provided by the second filter portion 104 to be used regardless of results of the right and left flatness detecting operations.

The center flatness exception detecting portion 902 outputs a signal at "1" in cases where using a result of processing provided by the first filter portion 103 makes it possible to perform an adequate interpolation computing operation even if the center flatness detecting portion 901 has determined that the inputted image data is data of a flat-luminance image. Then, the OR processing portion 903 outputs the logical sum of the output signals of the center flatness detecting portion 901 and the center flatness exception detecting portion 902, so that a more highly accurate selection signal SL can be generated. More specifically, in cases where the center flatness detecting portion 901 outputs a signal at "0" upon determination that the inputted image data is data of a flat-luminance image and the center flatness exception detecting portion 902 outputs a signal at "0" upon determination that the processing operation of the first filter portion 103 is unnecessary, the OR processing portion 903 outputs a signal at "0", thereby generating such a signal as to cause a result of processing provided by the second filter portion 104 to be used. In other cases, the OR processing portion 903 outputs a signal at "1", thereby generating such a signal as to cause a result of processing provided by the first filter portion 103 to be used.

Figure 10:
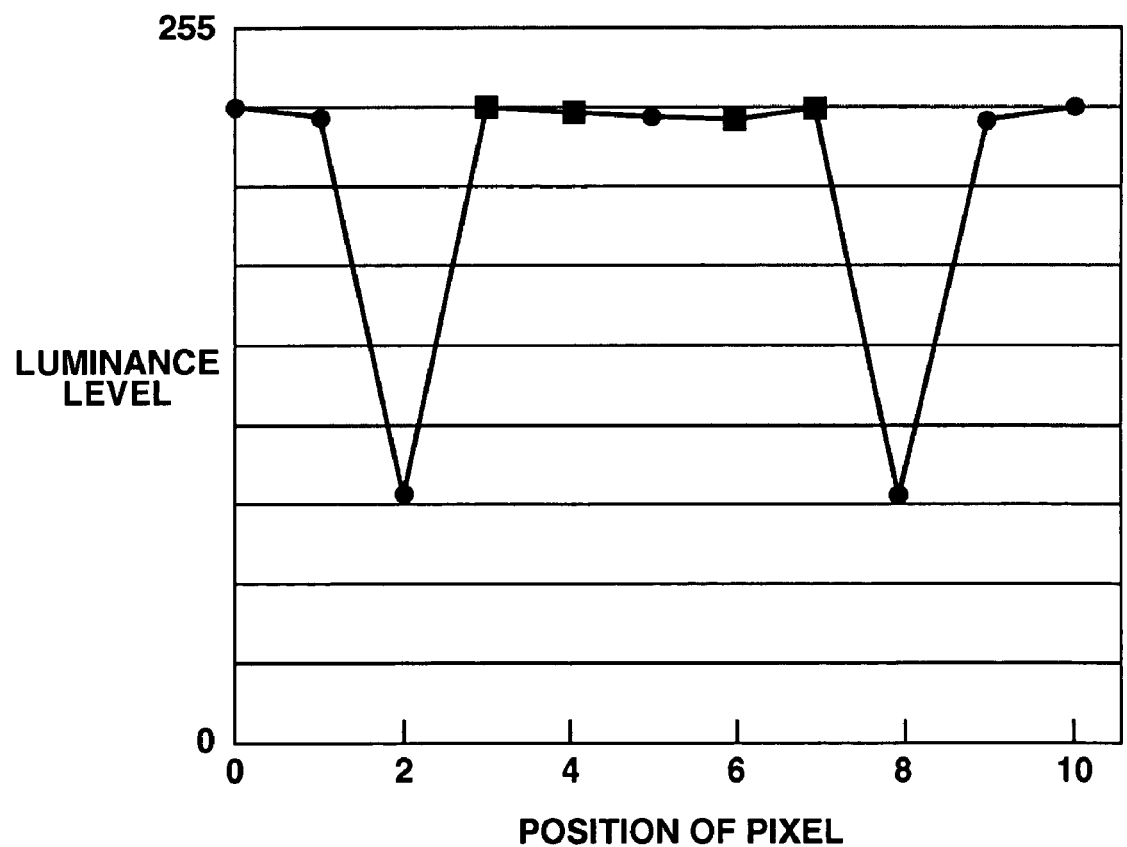
FIG. 10 is a graph showing the distribution of luminance levels of image data for the purpose of explaining a center flatness exception detecting operation in the second embodiment.

The center flatness exception detecting portion 902 is arranged to output a signal at "1" to cause a result of processing provided by the first filter portion 103 to be selected in the case of an example of image shown in FIG. 10. FIG. 10 is a graph showing the distribution of luminance levels of image data for the purpose of explaining the operation of the center flatness exception detecting portion 902. The graph of FIG. 10 is presumed to represent the distribution of luminance levels of an image having a period of three pixels in which two pixels are bright and one pixel is dark. Such a distribution would occur on an image having 200 lines on a print original or the like.

In that event, if an interpolation computing operation is performed with the use of a result of processing provided by the second filter portion 104, a portion of image data that should be subjected to interpolation computation as a dark pixel, such as a pixel in the position "2" or "8", would be subjected to interpolation computation as a bright pixel. To prevent such an inconvenience, the center flatness exception detecting portion 902 performs the following processing operation.

With the use of pixels "1", "2", "3", "7", "8" and "9", the center flatness exception detecting portion 902 outputs a signal at "1" in cases where a difference in luminance level (absolute value) between the pixels "1" and "2" is greater than a threshold value TH3, a difference in luminance level (absolute value) between the pixels "9" and "8" is greater than a threshold value TH4, a difference in luminance level (absolute value) between the pixels "1" and "3" is less than the difference in luminance level (absolute value) between the pixels "1" and "2", and a difference in luminance level (absolute value) between the pixels "7" and "9" is less than the difference in luminance level (absolute value) between the pixels "8" and "9". In other cases, the center flatness exception detecting portion 902 outputs a signal at "0".

In the second embodiment, the selection signal generating portion 102 is provided with the left flatness detecting portion 801, the right flatness detecting portion 802, the center flatness detecting portion 901 and the center flatness exception detecting portion 902. In cases where at least one of the left flatness detecting portion 801 and the right flatness detecting portion 802 has determined that the inputted image data is data of a flat-luminance image, or in cases where the center flatness detecting portion 901 has determined that the inputted image data is data of a flat-luminance image and a predetermined condition has not been satisfied in the center flatness exception detecting portion 902, the selection signal generating portion 102 performs such an operation as to select a result of processing provided by the second filter portion 104. Accordingly, it is possible to simply and precisely compensate for missing data corresponding to joint portions of the image sensors through interpolation so as to obtain a higher-quality image without making any conspicuous noise caused by the joint portions of the image sensors.

Incidentally, although each of the threshold values TH0 to TH4 used in the above-mentioned processing operations is merely a matter of design choice, if, assuming that the luminance level is divided into 255 levels, the threshold value is set to an extremely large value, such as level "200" or more, or an extremely small value, such as level "0", it becomes impossible to obtain an intended effect. Therefore, it is necessary to select an appropriate numerical value for the threshold value. For example, if the threshold value is set to level "20" or thereabout, an expected effect is easy to obtain.

The invention is not limited to the apparatuses described in the above embodiments, and may be applied to a system composed of a plurality of apparatuses or may be applied to a device composed of a single apparatus. It goes without saying that the invention may be accomplished by supplying, to the system or apparatus, a storage medium having software program codes stored therein for realizing the functions of each embodiment and by causing a computer (or CPU or MPU) of the system or apparatus to read and execute the program codes stored in the storage medium.

In this instance, the program codes themselves read from the storage medium realize the functions of the above embodiments, and the storage medium having the program codes stored therein constitutes the invention. As a storage medium for supplying the program codes, there may be used, for example, a floppy (trademark) disk, a hard disk, an optical disk, a magneto-optical disk, a CD-ROM, a CD-R, a magnetic tape, a nonvolatile memory card, a ROM, etc. Further, it goes without saying that not only the step of realizing the functions of the above embodiments by executing the program codes read by the computer but also the step of realizing the functions of the above embodiments by causing an operating system (OS) or the like working on the computer to perform a part or the whole of actual processing operations on the basis of instructions represented by the program codes may be included in the invention.

In addition, it goes without saying that the step of realizing the functions of the above embodiments by causing the program codes read from the storage medium to be written in a memory provided on a function expansion board inserted into a computer or a function expansion unit connected to a computer and, then, causing a CPU or the like provided on the function expansion board or the function expansion unit to perform a part or the whole of actual processing operations on the basis of instructions represented by the program codes.

As has been described above, according to each embodiment of the invention, even in an image reading apparatus in which a plurality of image reading sensors are joined one another, it is possible to simply and precisely compensate for missing data in joint portions of the plurality of image reading sensors through interpolation so as to obtain a high-quality image.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

What is claimed is:

1. An image reading apparatus comprising:
    image reading means for reading an image on an original for each pixel; and
    pixel interpolation means for compensating for pixel data corresponding to a target pixel through interpolation with interpolation data,
    wherein said pixel interpolation means comprising degree-of-flatness detecting means for detecting the degree of flatness of a plurality of pixel data situated in the vicinity of the target pixel;
    filter-size selecting means for selecting a filter size according to a result of detection provided by said degree-of-flatness detecting means; and
    interpolation-data computing means for computing the interpolation data by performing a filtering operation on the plurality of pixel data situated in the vicinity of the target pixel according to the filter size selected.

2. An image reading apparatus according to claim 1, wherein said image reading means is composed of a plurality of image sensors arranged in a row at predetermined intervals, and the target pixel is a pixel corresponding to a space between adjacent image sensors.

3. An image reading apparatus according to claim 1, wherein said interpolation-data computing means includes a plurality of filters having respective different filter sizes.

4. An image reading apparatus according to claim 1, wherein said filter size is based on the number of pixels that said interpolation-data computing means makes reference to when computing the interpolation data, 5. An image reading apparatus according to claim 1, wherein said degree-of-flatness detecting means detects the degree of flatness of a plurality of pixel data situated on each of both sides of the target pixel.

6. An image reading apparatus according to claim 5, wherein said degree-of-flatness detecting means computes a maximum value and a minimum value of the plurality of pixel data situated on each of both sides of the target pixel, and determines that the degree of flatness is high, if a difference between the maximum value and the minimum value is not greater than a predetermined threshold value.

7. An image reading apparatus according to claim 5, wherein said degree-of-flatness detecting means detects the degree of flatness of the plurality of pixel data situated on each of both sides of the target pixel.

8. A data interpolation method for an image reading apparatus having image reading means for reading an image on an original for each pixel and arranged to compensate for pixel data corresponding to a target pixel through interpolation with interpolation data, said data interpolation method comprising:
    detecting the degree of flatness of a plurality of pixel data situated in the vicinity of the target pixel;
    selecting a filter size according to a result of detection of the degree of flatness; and
    computing the interpolation data by performing a filtering operation on the plurality of pixel data situated in the vicinity of the target pixel according to the, filter size selected.

* * * * *